United States Patent [19]

Krupa et al.

[11] Patent Number: 4,741,854

[45] Date of Patent: May 3, 1988

[54] TRANSPARENT TOILET SOAP OF LIGHT COLOR

[75] Inventors: Jerry J. Krupa, Rockaway Township, Morris County; Michael I. Hill, Fords, both of N.J.

[73] Assignee: Lever Brothers Company, New York, N.Y.

[21] Appl. No.: 926,603

[22] Filed: Nov. 4, 1986

[51] Int. Cl.$^4$ .......................... C11D 7/54; C01B 17/16; C01B 6/00

[52] U.S. Cl. .......................... 252/105; 252/132; 252/133; 252/94; 252/188.21; 252/186.27

[58] Field of Search .............. 252/DIG. 16, 134, 105, 252/94, 188.21, 188.22, 188.23, 188.26, 188.27, 132, 133

[56] References Cited

U.S. PATENT DOCUMENTS

| | | | |
|---|---|---|---|
| 2,983,569 | 5/1961 | Charle | 252/188.21 |
| 3,592,944 | 7/1971 | Goerrig | 252/188.26 |
| 3,793,214 | 2/1974 | O'Neill et al. | 252/117 |
| 3,926,828 | 12/1975 | O'Neill | 252/117 |
| 4,207,198 | 6/1980 | Kenkare | 252/117 |
| 4,423,032 | 12/1983 | Abe | 424/71 |
| 4,439,417 | 3/1984 | Matsunaga | 424/71 |
| 4,468,338 | 8/1984 | Lindberg | 252/105 |

FOREIGN PATENT DOCUMENTS

| | | | |
|---|---|---|---|
| 1938177 | 2/1971 | Fed. Rep. of Germany . | |
| 1938178 | 2/1971 | Fed. Rep. of Germany . | |
| 115110 | 5/1918 | United Kingdom | 252/105 |

*Primary Examiner*—Paul Lieberman
*Assistant Examiner*—Isabelle Rodriguez
*Attorney, Agent, or Firm*—Milton L. Honig; James J. Farrell

[57] ABSTRACT

The invention provides a method and composition for substantially reducing color in transparent soap bars. Color reduction is achieved by combining in critical ratio a sulphur and a hydride type reducing agent such as sodium metabisulfite with sodium borohydride.

16 Claims, No Drawings

TRANSPARENT TOILET SOAP OF LIGHT COLOR

BACKGROUND OF THE INVENTION

1. Field of the Invention

The invention relates to transparent toilet soaps of improved color, a method for achieving color reduction in such soaps, and a new reducing agent system.

2. The Prior Art

Commercially available transparent toilet soaps tend to be rather darkly colored. This color may be an inherent property of unsaturated fatty acid soap and so be intrinsic to the raw materials. Alternatively, the color may arise from reactions during processing.

Formulations subject to discoloration induced by processing, in particular heat sensitive formulations, are those which contain alkanolamines and/or alkanolamine salts. It is during heating that the alkanolamines and their salts oxidize to form minute quantities of highly colored compounds. The resulting soap bar will, therefore, display a characteristic brown hue. Many consumers find brown to be an aesthetically unappealing toilet bar color.

Reducing agents might be expected to inhibit discoloration by reacting with the chromophores of color generating bodies. Indeed, the patent literature records a number of transparent soap formulations with reducing agents.

U.S. Pat. Nos. 3,926,828 and U.S. 3,793,214 to O'Neill et al. disclose the use of sodium hydrosulfite in a transparent soap at concentrations ranging from 0.01 to 0.05 wt.%. U.S. Pat. No. 4,207,198 to Kenkare teaches that sodium bisulfite may be added at a concentration of 0.5 wt.% as chemical stabilizer to squeezable, elastic detergent bars which may or may not be transparent. These detergent bars are substantially anhydrous and consist essentially of gelatin and synthetic detergents. U.S. Pat. No. 4,468,338 to Lindberg reports that alkali metal sulfite, bisulfite and metabisulfite can be used as discoloration preventing additives in transparent soap at concentrations ranging from 0.2 to 1.0 wt.%. These sulfur additives are effective only if citric acid and/or related compounds are also present. Japanese Pat. No. 59-6300 (Shiseido) reports transparent soaps blended with 0.05 to 1.0 wt.% sodium sulphide providing a medical benefit against acne. Pleasant pale yellow or brown colors are said to be characteristics of this soap. Finally, German Patents DE No. 1,938,177 and DE No. 1,938,178 to Henkel discloses lightly colored fatty acid soaps containing either hydrazine, hydroxylamine or alkali metal salts of 2 and 4 valent sulphoxo acids, e.g. sodium sulfite, as reducing agents in amounts preferably from about 0.01 to 5 wt.%.

One of the problems with known reducing agents is that these compounds have a finite solubility in soap systems. When this solubility is exceeded, the reducing agent will crystallize out as solid crystals thereby adversely affecting transparency. Moreover, it is known that electrolytes reduce the solubility of soaps in water. Thus, where the reducing agent is also an electrolyte, the soap itself would have an increased tendency to crystallize out as solid crystals further adversely affecting transparency. Accordingly, it would be desirable to find reducing systems operative at lower concentration levels than disclosed in the known art. Smaller amounts of reducing agent will, in turn, permit improved transparency.

It is, therefore, an object of the present invention to provide a color reducing system for toilet soap bars effective at lower electrolyte level than previously known.

It is another object of the present invention to substantially reduce the color while improving the transparency of presently known transparent soap bars.

Furthermore, it is an object of this invention to provide a method for inhibiting discoloration of soap bars in general and provide an improved reducing system.

SUMMARY OF THE INVENTION

A toilet bar is provided comprising:

(i) from 1% to 99% by weight of a $C_{12}$–$C_{22}$ fatty acid salt;

(ii) from 0.03 to less than 0.2 wt.% of a first reducing agent which includes sulfur in the +4 oxidation state and shows a negative oxidation potential relative to hydrogen; and (iii) from 0.0001 to less than 0.2 wt.% of a second reducing agent which includes hydrogen in the −1 oxidation state and shows a negative oxidation potential relative to hydrogen.

DETAILED DESCRIPTION OF THE INVENTION

Many transparent toilet soaps are made with ingredients that cause discoloration of the soap stock during processing. Reducing agents can inhibit this discoloration, but their inclusion in a transparent soap formulation can be expected to reduce transparency. The present invention involves using a combination of reducing agents within a specified concentration range so as to inhibit this discoloration without adversely affecting transparency.

The first class of reducing agents comprises compounds which include sulfur in the +4 oxidation state and which show a negative oxidation potential relative to hydrogen. Illustrative of this class are the salts of bisulfite, hydrosulfite, metabisulfite, sulfite and mixtures thereof. Suitable salt counterions include alkali metal, alkaline earth metal, ammonium, alkyl or hydroxyalkyl ammonium cations and mixtures thereof. At least one member of the first class must be present in the soap at a concentration range of from 0.03 to less than 0.2 wt.%. Preferably, the concentration should range from 0.03 to 0.1 wt.%, but optimally from 0.03 to 0.06 wt.%.

The second class of reducing agent includes those compounds having hydrogen in the −1 oxidation state and which show a negative oxidation potential relative to hydrogen. Illustrative of this class are sodium hydride, calcium hydride, sodium aluminum hydride, lithium hydride, sodium borohydride, sodium amide, diborane, alkyl and alkoxy aluminum hydrides, alkyl and alkoxy borohydrides, alkyl and alkoxy sodium aluminum hydrides, diimide and mixtures thereof. Particularly preferred among the foregoing are the boron hydrides, most especially sodium borohydride. An alkoxy sodium aluminum hydride that can be here useful is known as Vitride®, sold by the Hexcel Corporation. The concentration of this second class should range from about 0.0001 to less than 0.2 wt.% of the total soap composition. Preferably, the amount should range from 0.001 to 0.1 wt.%, but optimally from 0.001 to 0.002 wt.%.

The relative concentration by weight of the first to the second class of reducing agent should range from about 1000:1 to 1:100, preferably 60:1 to 1:5, and most preferably 40:1 to 1:1.

If the concentration of reducing agents used lies below the ranges specified herein, discoloration of the bar will occur during processing. Conversely, if the concentration of reducing agents used lies above the range specified herein, crystallization will occur within transparent toilet bars, with loss of transparency.

The term "transparent" as used in this specification is intended to connote its usual dictionary definition. Thus, a transparent soap, like glass, allows ready viewing of objects behind it. By contrast, a translucent soap although allowing light to pass through, causes the light to be so scattered, as by a very small proportion of crystals or insolubles, that it will be impossible to clearly identify objects behind the translucent soap.

Within the context of this invention, a toilet soap bar is deemed to be transparent if the maximum transmittance of light of any wavelength in the range of 200 to 800 nm through a sample 10 cm thick is at least 4%. Similarly, a bar is deemed hazy if the maximum transmittance of such light through the sample is between 1% and 4%. With regard to transparent bars, haziness is considered undesirable. A bar is deemed translucent if the maximum transmittance of such light through the sample is between 0.01% and 1%. Finally, a bar is deemed opaque if the maximum transmittance of such light is below 0.01%. This transmittance can be easily measured by placing a solid soap sample of the required thickness in the light beam path of a UV-VIS Spectrophotometer such as the Hewlett-Packard 8451A Diode Array Spectrophotometer. The advantage of this method of assessing transparency over previously published methods is that it is highly sensitive to optical clarity while independent of color.

The term "soap" is used herein in its popular sense, i.e., the alkali metal, ammonium, or substituted ammonium salt of aliphatic alkane- or alkene monocarboxylic acids. The term substituted ammonium is intended hereinafter to cover $C_1$–$C_4$ alkyl and hydroxyalkyl substituted nitrogen cations. Sodium, potassium, mono-, di- and tri-ethanol ammonium cations, or combinations thereof, are suitable for purposes of this invention. However, when the compositions of this invention are to be transparent, there are employed organic ammonium soaps, especially the triethanolammonium type.

Soaps useful herein are the well known salts of natural or synthetic aliphatic (alkanoic or alkenoic) acids having about 12 to 22 carbon atoms, preferably about 12 to 18 carbon atoms. Soaps having the fatty acid distribution of coconut oil may provide the lower end of the broad molecular weight range. Those soaps having the fatty acid distribution of peanut or rapeseed oil, or their hydrogenated derivatives, may provide the upper end of the broad molecular weight range.

It is preferred to use soaps having the fatty acid distribution of coconut oil or tallow, or mixtures thereof, since these are among the more readily available fats. The proportion of fatty acids having at least 12 carbon atoms in coconut oil soap is about 85%. This proportion will be greater when mixtures of coconut oil and fats such as tallow, palm oil, or non-tropical nut oils or fats are used, wherein the principle chain lengths are $C_{16}$ and higher.

Coconut oil employed for the soap may be substituted in whole or in part by other "high-lauric" oils, that is, oils or fats wherein at least 50% of the total fatty acids are composed of lauric or myristic acids and mixtures thereof. These oils are generally exemplified by the tropical nut oils of the coconut oil class. For instance, they include: palm kernel oil, babassu oil, ouricuri oil, tucum oil, cohune nut oil, murumuru oil, jaboty kernel oil, khakan kernel oil, dika nut oil, and ucuhuba butter.

A preferred soap is a mixture of about 15% to about 20% coconut oil and about 80% to about 85% tallow. These mixtures contain about 95% fatty acids having about 12 to about 18 carbon atoms. The soap may be prepared from coconut oil, in which case the fatty acid content is about 85% of $C_{12}$–$C_{18}$ chain length.

The soaps may contain unsaturation in accordance with commercially acceptable standards. Excessive unsaturation is normally avoided.

Processes for the production of transparent soap are discussed by F. W. Wells in "Soap and Chemical Specialties", Vol. XXXI, No. 6 and 7, June and July 1955, which article is incorporated herein by reference. Other typical methods of preparing transparent and opaque soaps may be found in U.S. Pat. No. 4,584,126, U.S. Pat. No. 3,155,624 and U.S. Pat. No. 2,820,768, all herein incorporated by reference.

A further desirable category of component are the polyhydric alcohols. Within this category may be included glycerine, sorbitol, maltitol, propylene and ethylene glycols and higher alkoxylated derivatives. Polyhydric alcohols, such as propylene glycol, may serve as diluents to thin out the otherwise thick mixture of caustic soda and fatty oils. Other polyhyric alcohols such as glycerine perform as a humectant and skin moisturizer. Amounts of these materials may range from about 1% to about 30%, preferably from about 2% to about 10% by weight of the total composition.

Other performance chemicals may be added with these compositions. For instance, from 2 to 10% of a suds-boosting detergent salt may be incorporated. This type additive may be selected from the group consisting of alkali metal, ammonium and substituted ammonium higher aliphatic fatty alcohol sulfates, alkyl aryl sulfonates and the higher aliphatic fatty acid taurinates.

A superfatting agent to further enhance mildness and reduce mush properties may be included, for example, a fatty acid of carbon atom numbering 10–18, preferably 10–16 in an amount up to 25% by weight of the composition.

Adjunct materials including germicides, perfumes, and colorants may also be present.

The following examples will more fully illustrate the embodiments of this invention. All parts, percentages and proportions referred to herein and in the appended claims are by weight of the total composition unless otherwise stated.

EXAMPLE 1

Illustrative of the transparent compositions of the present invention is the following formula:

TABLE I

| Component | Weight % |
|---|---|
| Triethanolamine | 45.0 |
| Opaque Toilet Soap | 20.4 |
| Lily Stearic Acid | 11.6 |
| Glycerine | 8.3 |
| Reducing Agents | 0–3.0 |
| Water | to 100 |

Lily stearic acid and reducing agents and a small portion of the water were dissolved in triethanolamine.

The mixture was then heated to approximately 80° C. for 10 minutes. Glycerine, the balance of water and opaque toilet soap were then added. Subsequent to combining the components, the mixture was stirred at 80° C. until all components were dissolved. This mixture was then poured into molds and allowed to cool.

As used in all the Examples of the specification, the term "opaque toilet soap" refers to a mixture of sodium tallowate and sodium cocoate, where the ratio of tallowate to cocoate is 82:18, and the water content is 12%.

EXAMPLE 2

This Example illustrates the performance of various reducing agents and combinations to inhibit color formation. The accompanying Table lists the effects of varying the type and amounts of reducing agents in the formula of Example 1.

TABLE II

Results of Incorporating Reducing Agents

| Sample No. | Reducing Agent | Weight % | Color | Clarity |
|---|---|---|---|---|
| 1 | None | — | Brown | Transparent |
| 2 | Sodium Metabisulfite | 3.0 | Colorless | Translucent |
| 3 | Sodium Metabisulfite | 2.0 | Colorless | Hazy |
| 4 | Sodium Metabisulfite | 1.3 | Colorless | Hazy |
| 5 | Sodium Metabisulfite | 0.6 | Colorless | Hazy |
| 6 | Sodium Metabisulfite | 0.3 | Colorless | Hazy |
| 7 | Sodium Metabisulfite | 0.2 | Colorless | Hazy |
| 8 | Sodium Metabisulfite | 0.13 | Orange | Transparent |
| 9 | Sodium metabisulfite | 0.06 | Orange | Transparent |
| 10 | Sodium metabisulfite | 0.03 | Colorless | Transparent |
| | Sodium borohydride | 0.0005 | | |
| 11 | Sodium metabisulfite | 0.04 | Colorless | Transparent |
| | Sodium borohydride | 0.001 | | |
| 12 | Sodium metabisulfite | 0.06 | Colorless | Transparent |
| | Sodium borohydride | 0.001 | | |
| 13 | Sodium borohydride | 0.3 | Orange | Hazy |
| 14 | Sodium borohydride | 0.1 | Brown | Hazy |
| 15 | Sodium borohydride | 0.02 | Orange | Transparent |

From the foregoing results, it is seen that sodium borohydride at concentrations from 0.3 to 0.02% by itself cannot substantially reduce color. Borohydride at 0.1% and 0.3% even imparts a haze to the bars. Sodium metabisulfite at 3% is effective at reducing color but renders the bar only translucent. When utilized at 2.0, 1.3, 0.6, 0.3 and 0.2%, sodium metabisulfite removes color and overcomes translucency. However, the clarity still remains unacceptably hazy. Transparency returns at 0.13% metabisulfite but this is ineffective at color removal; the bar is orange.

Consequently, Table II establishes that low levels of sodium borohydride and metabisulfite are individually ineffective at substantially reducing color while higher levels affect transparency. By contrast, combinations of metabisulfite and borohydride unexpectedly provide both transparent and colorless bars. Thus, it is shown in Table II that a combination of 0.04% or 0.06% sodium metabisulfite with 0.001% sodium borohydride produces a bar which is both colorless and fully transparent. A similar result was achieved with 0.03% metabisulfite combined with 0.0005% borohydride. In a control experiment (Sample 1), both sodium metabisulfite and borohydride were omitted. Soap bars resulting from this composition were colored brown, although transparent.

The foregoing description and Examples illustrate selected embodiments of the present invention. In light thereof, various modifications will be suggested to one skilled in the art all of which are within the spirit and purview of this invention.

What is claimed is:

1. A transparent toilet bar comprising:
(i) from 1% to 99% by weight of a $C_{12}$–$C_{22}$ carbon atom fatty acid salt;
(ii) from 0.03 to less than 0.2 wt.% of a first reducing agent selected from the group consisting of the salts of bisulfite, hydrosulfite, metabisulfite, sulfite and mixtures thereof; and
(iii) from 0.0001 to less than 0.2 wt.% of a second reducing agent selected from the group consisting of sodium hydride, calcium hydride, lithium hydride, sodium aluminum hydride, sodium borohydride, sodium amide, diborane, alkyl and alkoxy aluminum hydrides, alkyl and alkoxy borohydrides, alkyl and alkoxy sodium aluminum hydrides, diimide and mixtures thereof.

2. A toilet bar according to claim 1 wherein the amount of the first reducing agent ranges from 0.03 to 0.1 wt.%.

3. A toilet bar according to claim 1 wherein the amount of the first reducing agent ranges from 0.03 to 0.06 wt.%.

4. A toilet bar according to claim 1 wherein the amount of the second reducing agent ranges from 0.001 to 0.1 wt.%.

5. A toilet bar according to claim 1 wherein the amount of the second reducing agent ranges from 0.001 to 0.002 wt.%.

6. A toilet bar according to claim 1 wherein said first reducing agent is sodium metabisulfite.

7. A toilet bar according to claim 1 wherein said second reducing agent is sodium borohydride.

8. A toilet bar according to claim 1 having a combination of metabisulfite and borohydride salts.

9. A method of reducing color in transparent toilet bars comprising combining with from 1% to about 99.9% of a $C_6$–$C_{22}$ alkyl fatty acid salt, a reducing agent system comprising:
(i) from 0.03 to less than 0.2 wt.% of a first reducing agent selected from the group consisting of the salts of bisulfite, hydrosulfite, metabisulfite, sulfite and mixtures thereof; and
(ii) from 0.0001 to less than 0.2 wt.% of a second reducing agent selected from the group consisting of sodium hydride, calcium hydride, lithium hydride, sodium aluminum hydride, sodium borohydride, sodium amide, diborane, alkyl and alkoxy aluminum hydrides, alkyl and alkoxy borohydrides, alkyl and alkoxy sodium aluminum hydrides, diimide and mixtures thereof.

10. A method according to claim 9 wherein the amount of the first reducing agent ranges from 0.03 to 0.1 wt.%.

11. A method according to claim 9 wherein the amount of the first reducing agent ranges from 0.03 to 0.06 wt.%.

12. A method according to claim 9 wherein the amount of the second reducing agent ranges from 0.001 to 0.1 wt.%.

13. A method according to claim 9 wherein the amount of the second reducing agent ranges from 0.001 to 0.002 wt.%.

14. A method according to claim 9 wherein said first reducing agent is sodium metabisulfite.

15. A method according to claim 1 wherein the second reducing agent is sodium borohydride.

16. A method according to claim 9 having a combination of metabisulfite and borohydride salts.

* * * * *